United States Patent [19]

Davis

[11] Patent Number: 4,561,336

[45] Date of Patent: Dec. 31, 1985

[54] PORTABLE UNIVERSAL POWER MITER SAW WORKBENCH

[76] Inventor: Harold E. Davis, 31 Fairview La., Naugatuck, Conn. 06770

[21] Appl. No.: 582,834

[22] Filed: Feb. 23, 1984

[51] Int. Cl.⁴ .......................... B25H 1/16; B25H 1/14; B25H 1/06
[52] U.S. Cl. ........................................ 83/859; 83/477; 144/286 R; 144/287
[58] Field of Search .................. 83/477, 859; 144/286, 144/287

[56] References Cited

U.S. PATENT DOCUMENTS

| | | | |
|---|---|---|---|
| 3,149,651 | 9/1964 | Belrose | 144/286 R |
| 3,815,463 | 6/1974 | Allaire | 144/286 R |
| 4,341,247 | 7/1982 | Price | 144/287 |

FOREIGN PATENT DOCUMENTS 812707  9/1951  Fed. Rep. of Germany ...... 144/286

Primary Examiner—Donald R. Schran
Attorney, Agent, or Firm—Bachman & LaPointe

[57] ABSTRACT

A portable workbench is constructed so as to accept miter saws of any size in a simple and convenient manner. The workbench comprises a power tool supporting site and a workpiece supporting surface wherein the power tool supporting site and workpiece supporting surface are adjustable in a substantially vertical direction relative to each other. The power tool supporting site and workpiece supporting surface are each constructed of two frames which are adjustable in a substantially horizontal direction so as to accept any size miter saw on the power tool supporting site.

10 Claims, 7 Drawing Figures

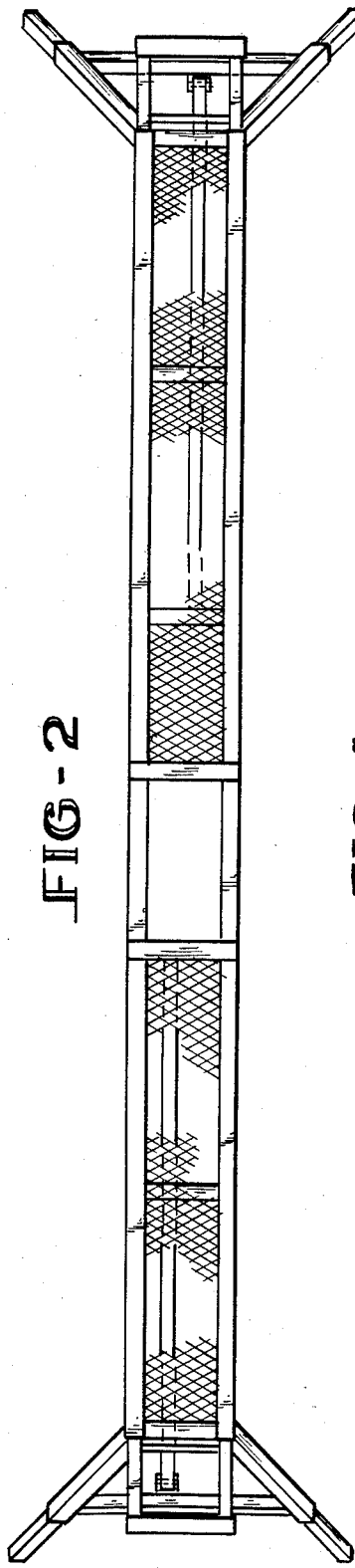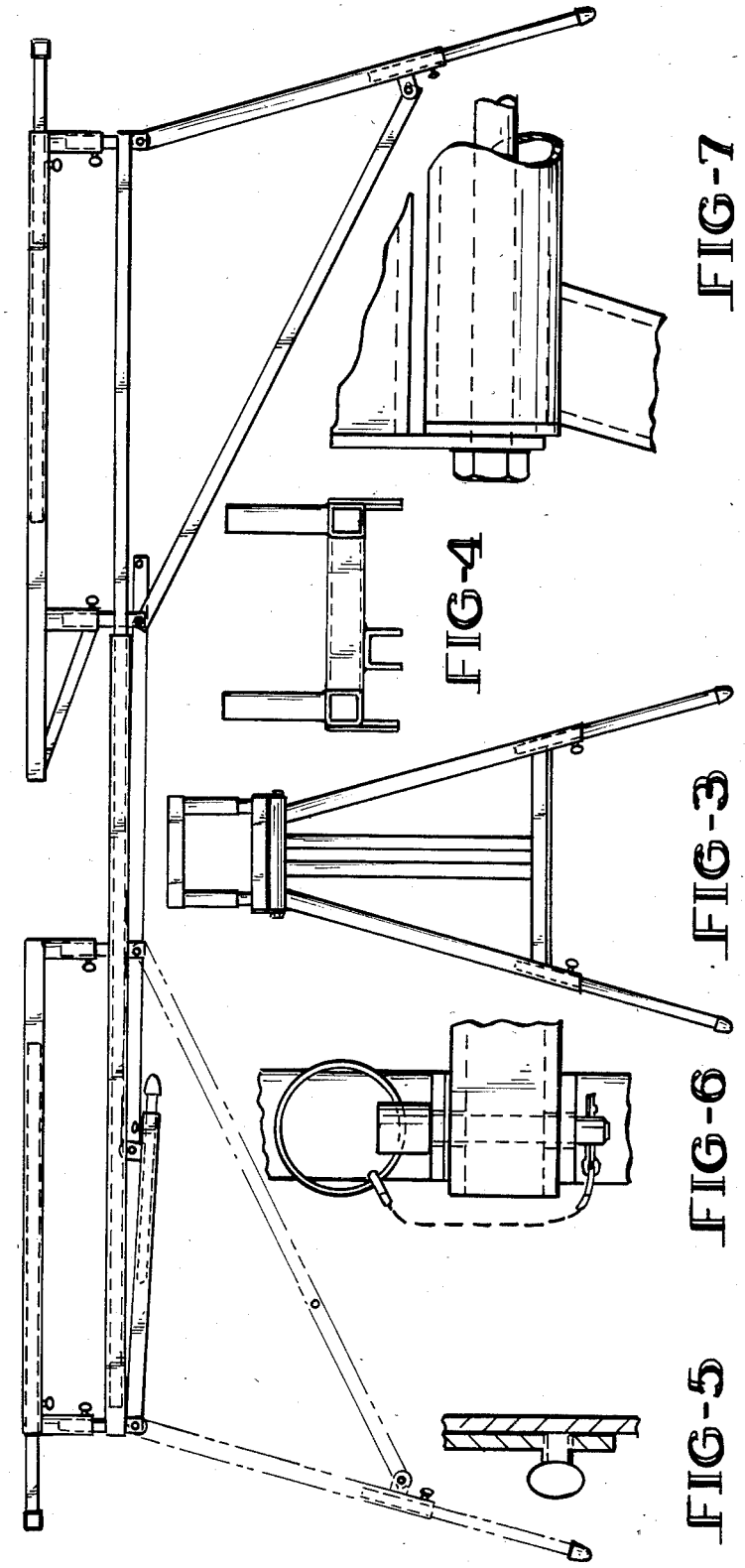

PORTABLE UNIVERSAL POWER MITER SAW WORKBENCH

BACKGROUND OF THE INVENTION

The present invention resides in a portable workbench used for carrying out precision cuts on a workpiece and, more particularly, a portable universal power miter saw workbench which is capable of being adjusted so as to accept any size miter saw.

Heretofore, known workbenches used to support a miter saw for operating on a workpice were quite cumbersome and generally required a number of people to transport the bench from worksite to worksite. In addition, once the workbench was located at the construction site it was often quite difficult to position the workbench in a stable manner due to the topography of the terrain. Furthermore, workbenches known in the prior art could not accommodate a wide range in size of miter saws as well as a variety of other power tools. A typical construction table to be used in combination with a miter saw is disclosed in U.S. Pat. No. 4,335,765 by Rholand D. Murphy. While the table disclosed in the '765 patent is capable of receiving a plurality of work tools, the table is not universally adjustable so as to readily accept power miter saws of various sizes which requires not only adjustment of the size of the power tool supporting site but also adjustment of the workpiece supporting surface relative to the power tool supporting site. U.S. Pat. No. 4,161,974 discloses a portable bench frame for supporting a plurality of power tools wherein the relative spacing between the power tool supporting site and the workpiece supporting surface can be varied. While the bench frame of the '974 patent does alleviate some of the disadvantages noted above, the bench is still incapable of accepting miter saws of various sizes in an easy and simple manner.

Accordingly, it is a principal object of the present invention to provide a portable workbench used for carrying out precision cuts on a workpiece.

It is a particular object of the present invention to provide a portable workbench which is universally adjustable to accept various sized miter saws.

It is a further object of the present invention to provide a universally adjustable portable miter saw workbench which is stable on all types of surfaces.

It is a still further object of the present invention to provide a universally adjustable portable miter saw workbench which is simple in construction and inexpensive to manufacture.

Further objects and advantages of the present invention will appear hereinbelow.

SUMMARY OF THE INVENTION

In accordance with the present invention the foregoing objects and advantages are readily obtained.

The present invention comprises a portable workbench which is constructed so as to accept miter saws of any size in a simple and convenient manner. In accordance with the present invention, the workbench comprises a power tool supporting site and a workpiece supporting surface wherein the power tool supporting site and workpiece supporting surface are adjustable in a substantially vertical direction relative to each other. The power tool supporting site and workpiece supporting surface are each constructed of two frames which are adjustable in a substantially horizontal direction relative to each other so as to accept any size miter saw on the power tool supporting site. The support site and workpiece supporting surface are supported on a pair of foldable legs the length of which are adjustable so as to allow the bench to rest on any surface of varying topography. The workbench is constructed of lightweight metal tubing thereby allowing for easy portable movement thereof.

Thus, the apparatus of the present invention provides a highly efficient workbench for miter saws which is characterized by simplicity of structure and ease of operation.

BREIF DESCRIPTION OF THE DRAWINGS

FIG. 1 is a front elevational view of the portable workbench of the present invention.

FIG. 2 is a top plane view of the workbench of FIG. 1.

FIG. 3 is an end elevational view of the workbench of the present invention.

FIG. 4 is an enlarged partial sectional view of the power tool support site of the present invention.

FIG. 5 is an enlarged view showing the thumb screw arrangement in accordance with the present invention.

FIG. 6 is an enlarged view showing the connecting mechanism for the leg assemblies of the present invention.

FIG. 7 is an enlarged partial sectional view of the leg assemblies pivot in accordance with the present invention.

DETAILED DESCRIPTION

With reference to the drawings, the workbench 10 of the present invention comprises a power tool supporting site 12 mounted on a pair of leg assemblies 16 and a workpiece supporting surface 14 mounted above the power tool supporting site 12.

Power tool supporting site 12 is formed of two substantially square-shaped frame members 18 and 20 which comprise a pair of parallel leg portions 22 and 24, respectively, joined together by cross portions 26 and 28, respectively, by any suitable means such as welding, gluing, etc. Leg portions 22 of frame member 18 are formed of a hollow metal tubing, such as aluminum, and telescopically receive leg portions 24 of frame member 20 which likewise may be formed from aluminum tubing. Leg portions 24 are secured in place in leg portions 22 by means of thumb screws 30 which are shown in detail in FIG. 5.

Power tool support site 12 is mounted on leg assemblies 16 by means of brackets 32 and 34. As can best be seen in FIGS. 1, 4, 6 and 7, brackets 32 are mounted by means of welding or the like on cross members 36 which in turn are secured to the leg portions 22 and 24 of frames 18 and 20 by welding or the like. The brackets 32 are U-shaped and are provided with holes 40 on the legs 38 thereof which receive a pin member 42 for reasons to be made clear hereinbelow. Each of the brackets 32 are offset from the centerline of the workbench 10 on opposite sides thereof (see FIGS. 2 and 4). Brackets 34 which are mounted on cross portions 26 and 28 pivotably secure leg assemblies 16 to the power tool supporting site 12 by means of nut and bolt assemblies 44. Each leg assembly 16 comprises a pair of legs 46 arranged in slanting positions and, when viewed from the end as in FIG. 3, form with bar 48 the letter A. As viewed in FIGS. 1 and 2, the legs are also inclined outwardly from the ends of the bench. The top of the legs 46 are welded to a hollow tube 50 which is pivotably secured to the brackets 34 by the nut and bolt assemblies 44. Bar 48 has a U-shaped bracket 52 welded thereto which receives one end of brace 54 by means of a pin assembly 42 as shown in FIG. 6. The other end of brace 54 is received in brackets 32 in a similar manner. A hole 56 is provided intermediate the ends of brace 54 for securing the brace 54 to bracket 32 when the leg assemblies 18 are folded up. As can best be seen in FIG. 2, the braces 54 are offset from each other in the same manner as brackets 32. Each leg 46 of leg assemblies 16 are hollow for telescopically receiving extension portions 57 which are secured in place by thumb screw 30. The extension portions 57 in combination with the angled slant of the leg 46 assure that the bench can be stably mounted on all surfaces of varying topography.

Mounted on the top surface of frame members 18 and 20 are a plurality of guide members 58 which are adapted to receive the workpiece support surface 14. Workpiece support surface 14 consists of left and right table tops 60 and 62, respectively, which comprise side members 64 and end members 66. Side members 64 are hollow and telescopically receive adjustable extension wings 68 which are held in place by thumb screws as previously discussed. Mounted on the bottom surface of the table tops 60 and 62 are hollow tube members 70 which are adapted to receive the plurality of guide members 58 mounted on frame members 18 and 20. Thumb screws 30 are provided on the tube members 70 for securing the workpiece support surface 14 with respect to the power tool support site 12.

With reference to the drawings, the operation of the workbench will be discussed in detail. When erected the portable workbench 10 is supported by the leg assemblies 18 which are held in place by locating the brace 54 in the bracket 32 and securing same by means of pin assembly 42 as shown in FIGS. 1 and 6. When the workbench 10 is to be transported the leg assemblies are folded up by removing pin assembly 42 and locating hole 56 provided on the brace 54 in the bracket 32 and thereafter reassembling pin assembly 42. The height of the leg assemblies can be adjusted by adjusting extension portions 56 which are located in the legs 46 of the assemblies 18. In accordance with the present invention the miter saw is located on power tool support site 12 in the gap 76 provided between table tops 60 and 62. Depending on the size of the miter saw the power tool supporting site 12 may be adjusted in the horizontal direction by loosening the thumb screws 30 and adjusting the leg portions 24 of frame member 20 in the leg portions 22 of frame member 18. Again, depending on the size of the miter saw being used the workpiece supporting surface 14 comprising both table tops 60 and 62 may be moved relative to the power tool support site by adjusting the tubes 70 which telescopically receive guide members 58. Depending on the size of the workpiece the extension wings 68 can be adjusted.

As noted above the components of the workbench are preferably made of a light metal material and preferably take the form of hollow tubes. The various tubular components can be held together by welding, gluing or any other suitable manner. The workbench of the present invention provides an easily transportable workbench which is readily adapted to receive miter saws of all sizes.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A portable universal power miter saw workbench comprising a power tool supporting site mounted on a pair of leg assemblies and a workpiece supporting surface mounted above and substantially parallel to said power tool supporting site, first adjustment means between said power tool supporting site and said workpiece supporting surface for adjusting the position of said workpiece supporting surface relative to said power tool supporting site and second adjustment means associated with said power tool supporting site for adjusting the length of said power tool supporting site and said workpiece supporting surface.

2. A workbench according to claim 1 wherein said first adjustment means comprises a plurality of guide members mounted on said power tool supporting site and a plurality of tubes mounted on said workpiece supporting surface wherein said tubes telescopically receive said guide members.

3. A workbench according to claim 2 wherein said plurality of tubes are provided with thumb screws for securing said workpiece supporting surface in place on said guide members.

4. A workbench according to claim 1 wherein said power tool supporting site comprises two frame members, each of said frame members having a pair of parallel leg portions joined together by a cross portion.

5. A workbench according to claim 4 wherein said second adjustment means comprises said parallel leg portions of one of said frame members being telescopically received in the parallel leg portions of the other of said frame members.

6. A workbench according to claim 1 wherein each of said leg assemblies comprises a pair of legs pivotably mounted to the underside of said power tool supporting site wherein the length of each of said pair of legs is adjustable.

7. A workbench according to claim 6 wherein each of said leg assemblies further includes a brace having one end thereof secured to said leg assembly and the other end thereof secured to a bracket on the underside of said power tool supporting site when said leg assembly supports said workbench.

8. A workbench according to claim 7 wherein said brace is provided with a hole intermediate the ends thereof such that said brace is secured to said bracket by said hole when said leg assemblies are folded up.

9. A workbench according to claim 1 wherein said workpiece supporting surface consists of a pair of table tops mounted above said power tool supporting site wherein said table tops are spaced from each other so as to form a gap for receiving said power tool.

10. A workbench according to claim 9 wherein each of said table tops telescopically receive adjustable extension wings.

* * * * *